E. M. HEYLMAN.
LISTER.
APPLICATION FILED JULY 3, 1914.
1,125,529.
Patented Jan. 19, 1915.
2 SHEETS—SHEET 1.
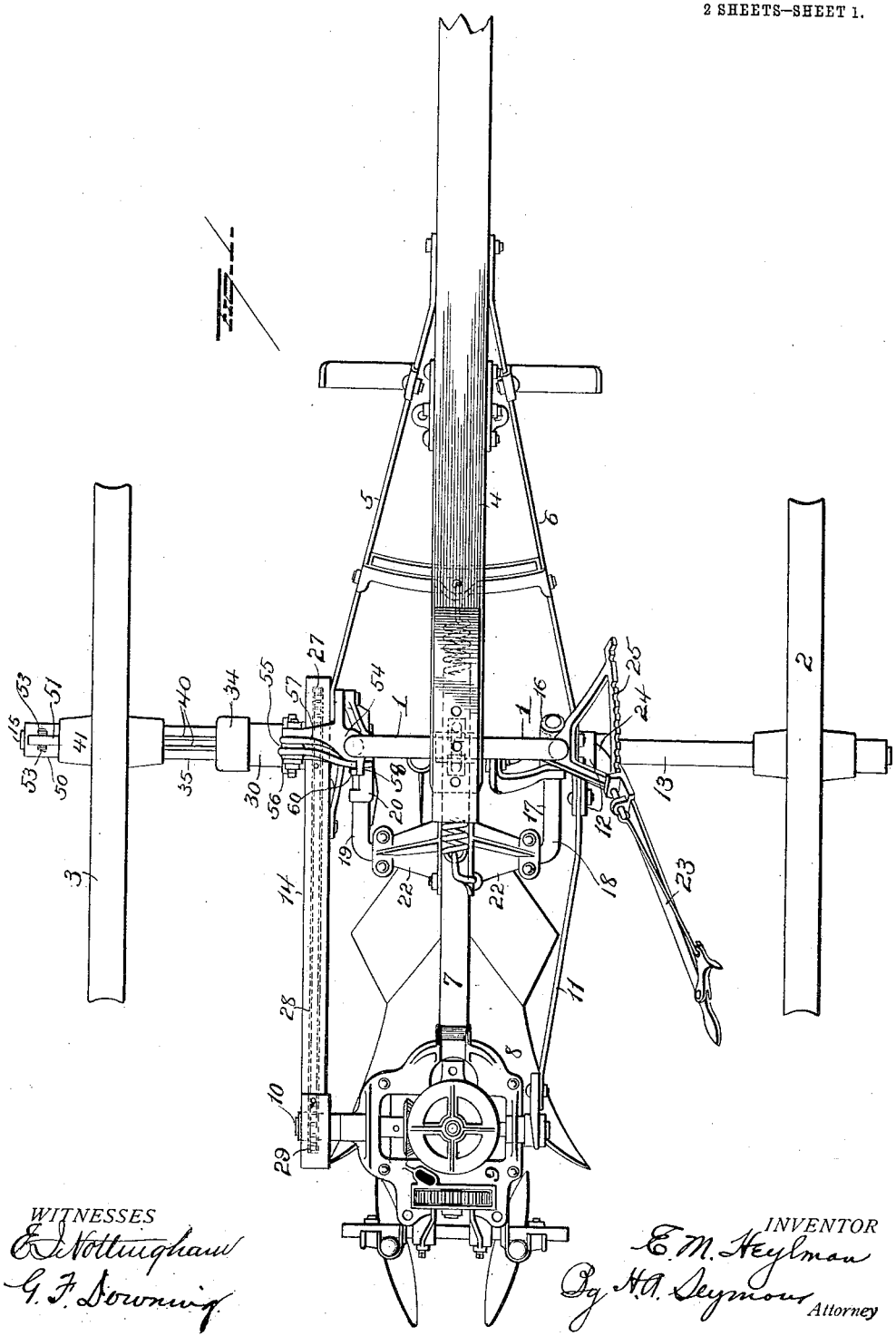

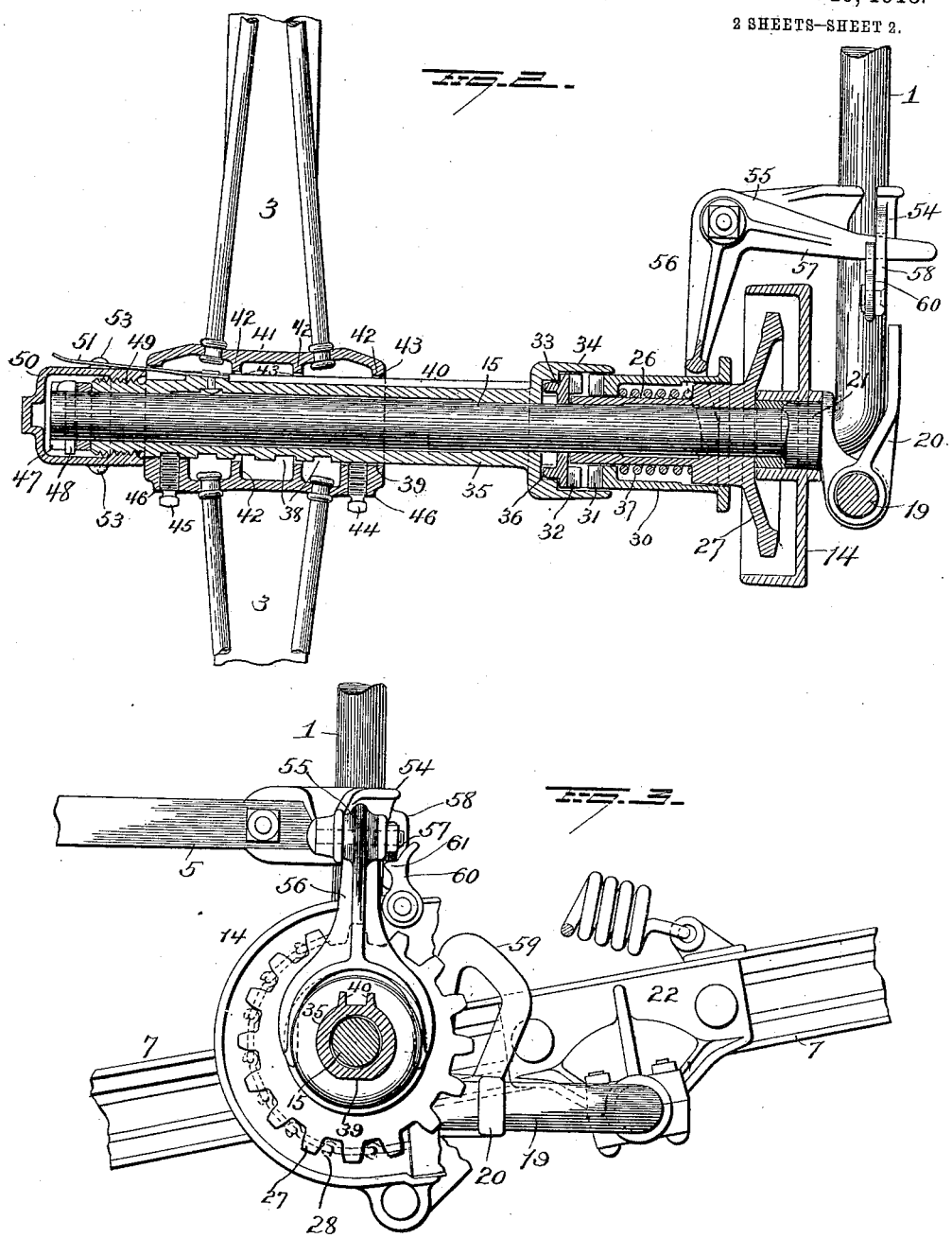

UNITED STATES PATENT OFFICE.

EDWARD M. HEYLMAN, OF SOUTH BEND, INDIANA, ASSIGNOR TO OLIVER CHILLED PLOW WORKS, OF SOUTH BEND, INDIANA.

LISTER.

1,125,529.  Specification of Letters Patent.  Patented Jan. 19, 1915.

Application filed July 3, 1914. Serial No. 848,827.

*To all whom it may concern:*

Be it known that I, EDWARD M. HEYLMAN, of South Bend, in the county of St. Joseph and State of Indiana, have invented certain new and useful Improvements in Listers; and I do hereby declare the following to be a full, clear, and exact description of the invention, such as will enable others skilled in the art to which it appertains to make and use the same.

This invention relates to improvements in listers and more particularly to improved means for controlling the operation of the clutch devices for the gearing between the drive wheel and the seeding mechanism, the object of my present invention being to provide simple and efficient means in an automatically shiftable clutch mechanism for listers for locking the clutch open when it is desired to use the machine as a plow.

With this and other objects in view, the invention consists in certain novel features of construction and combination of parts as hereinafter set forth and pointed out in the claims.

In the accompanying drawings, Figure 1 is a plan view of a lister showing an embodiment of my invention; Fig. 2 is an enlarged sectional view illustrating the wheel mounting and clutch devices, and Fig. 3 is an enlarged side elevation, partly in section and partly broken away showing the clutch operating and controlling devices.

1 represents an arch axle having its ends journaled in the hubs of carrying wheels 2, 3. The rear end of a pole or tongue 4 is mounted upon the top of the arch axle and braces 5, 6, connect a forward portion of said pole or tongue with the arch axle in proximity to the lower ends of the upright portions thereof.

A beam 7 is disposed between the wheels under the arched portion of the axle so as to extend forwardly and rearwardly beyond the same and is provided at its rear end with a plow body 8 and seeding mechanism 9. The shaft 10 of the seeding mechanism projects at both ends beyond its bearings and with one projecting end of said shaft, the rear end of a bar 11 is loosely connected, the other end of said bar being secured to a sleeve 12 mounted loosely upon the horizontal journal member 13 of the arch axle. A guard 14 is loosely mounted at its rear end upon the other end of the drive shaft of the seeding mechanism and its forward end, this casing is loosely mounted upon the horizontal journal member 15 of the arch axle. The bar 11 and guard casing 14 thus constitute connecting means between the two ends of the driving shaft 10 and the arch axle and maintain the former always parallel with the journal members of the latter and always the same distance therefrom.

The sleeve 12 is provided with a socket member 16 disposed at right angles thereto for the reception of one arm 17 of a rearwardly projecting bail 18,—the other arm 19 of said bail being secured in a socketed arm 20 having a sleeve 21 mounted loosely upon the journal member 15 of the arch axle. The intermediate portion of the bail 18 is pivotally connected with the plow beam 7 by means of bracket arms 22, so that when said bail is rocked (as hereinafter explained), the plow beam and the various instrumentalities which it carries will be raised or lowered.

A hand lever 23 is secured to a lug 24 projecting from the sleeve or casting 12, whereby power may be applied for rocking the bail 18 to raise or lower the planting mechanism,—said hand lever being provided with a suitable detent to engage a notched segment 25 secured to the arch axle.

The elongated sleeve or hub portion 26 of a sprocket wheel 27 is loosely mounted upon the journal member 15 of the arch axle and this sprocket is connected by a sprocket chain 28 with a sprocket wheel 29 on the driving shaft 10 of the seed dropping mechanism,—said sprocket wheels and chain being housed within the guard casing 14.

Mounted slidably upon and rotatable with the extended hub or sleeve 26 of the sprocket wheel 27 is a clutch sleeve 30 having clutch teeth 31 at one end to engage teeth 32 on a removable ring 33 also loosely mounted on the axle member 15. The clutch ring 33 is inclosed within a casing 34 at the inner end of a bearing sleeve or axle box 35 and is provided with lugs 36 which engage said sleeve or axle box so as to rotate therewith, and the toothed outer end of the clutch sleeve also projects into said casing 34. The clutch members are pressed into interlocking engagement by the action of a spring 37 located between the sleeves 26 and 30 which rotate together and hence said spring will not be subjected to frictional engagement of a rotating part.

The sleeve or axle box is mounted freely upon the journal extension 15 of the arch axle and is provided with a plurality of notches 38 and with a flat exterior face at 39. Said sleeve or axle box is also provided with two longitudinally disposed parallel ribs 40. The hub 41 of the carrying wheel 3 (which latter is also a drive wheel for the gearing which operates the seeding mechanism) is made with inwardly projecting flanges 42 having notches 43 for the accommodation of the parallel ribs 40 on the bearing sleeve or axle box 35, so as to cause the latter to rotate with the wheel. The wheel 3 may be moved laterally by moving the hub 41 on the axle box 35, and may be secured at any desired lateral adjustment by means of set screws 44, 45, passing through enlargements 46 at the ends of the hub. The set screw 44 engages the flat face 39 of the axle box while the set screw 45 engages in one of the notches 38.

A step washer 47 may be located on the axle member 15 at the end of the axle box and held in place by a linch pin 48 passing transversely through the axle member near the free end of the latter.

The axle box 35 is provided exteriorly with threads 49 in proximity to its outer end, for the accommodation of internal threads of a grease cap 50 which incloses the outer end of the axle member and axle box. In order to prevent this cap from turning a spring 51 is employed. This spring is secured to a flattened enlargement on the axle box between the parallel flanges 40 and is prevented from lateral displacement by the latter,—the free end portion of said spring projecting over the cap 50 and adapted to become disposed between cam-lugs 53 on said cap. At least two pairs of such cam lugs should be provided and located diametrically opposite to each other, so that the cap may be turned a half revolution to force lubricant forwardly and then locked to prevent unscrewing.

For the purpose of controlling the operation of the dropping mechanism and to cause the source of driving power to be thrown out of action when the beam is raised and into action when the beam is lowered, and to effect these results automatically and efficiently, the devices now to be explained are employed.

A bracket 54 is secured to an upright member of the arch axle 1 and on this bracket, a bell-crank-lever 55 is mounted and constitutes the shifting lever for the clutch. The arm 56 of this bell-crank is bifurcated to embrace the clutch sleeve for sliding the latter out of coöperative relation to the clutch ring and the arm 57 of said bell-crank projects freely through a guide loop 58 on the bracket 54, so as to be in position to be engaged by a cam arm 59 mounted on the arm 19 of the bail 18.

When the machine is employed to condition the soil for planting, as when it is operated as a plow, the seeding mechanism should be entirely out of action and to effectively accomplish this result so that no part of said mechanism nor its driving gearing shall be in operation when the machine is operated as a plow, I provide a manually operable latch 60 which is pivotally supported by the bracket 54 and provided with a shoulder 61 to engage under the arm 57 of the bell-crank 55 and thus hold the clutch devices in disengaged positions, after the bail 18 and beam 7 have been lowered.

I do not claim herein, the specific structure of the wheel mounting, the same being the subject of divisional application for patent filed by me on the 2nd day of November 1914 and designated by Serial No. 869,922; nor do I claim broadly herein, the automatic clutch shifting devices herein shown and described, said devices being the subject of application filed by me on the 14th day of May 1914 and designated by Serial No. 838,539.

Various slight changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. The combination with a wheeled frame, soil-engaging means, seeding mechanism, gearing connecting a wheel of the wheeled frame with said seeding mechanism, a clutch included in said gearing, raising and lowering means for the soil-engaging means, and clutch controlling means operable by said raising and lowering means, of a latch device for locking said clutch controlling means, whereby the soil-engaging means may be lowered without operating the clutch controlling means.

2. The combination with a wheeled frame, a beam, soil-engaging means carried by the frame, seeding mechanism, gearing between one of the wheels and said seeding mechanism, clutch devices for connecting said gearing with one of the wheels of the frame, and raising means for the beam, of a bell-crank coöperating with the clutch devices, a cam carried by the raising mechanism and coöperative with said bell-crank to operate the clutch devices, and a latch to engage said bell-crank and retain the clutch devices disengaged after the beam has been lowered.

In testimony whereof, I have signed this specification in the presence of two subscribing witnesses.

EDWARD M. HEYLMAN.

Witnesses:
EDWIN NICAR,
KATE E. BUCKLEY.